(12) United States Patent
Zhang et al.

(10) Patent No.: US 9,197,550 B2
(45) Date of Patent: Nov. 24, 2015

(54) METHOD AND DEVICE FOR DETERMINING FORWARDING RULE FOR DATA PACKET

(75) Inventors: Lixin Zhang, Shanghai (CN); Duan Chen, Shanghai (CN); Lijun Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 455 days.

(21) Appl. No.: 13/513,959

(22) PCT Filed: Dec. 17, 2009

(86) PCT No.: PCT/CN2009/075665
§ 371 (c)(1),
(2), (4) Date: Jun. 5, 2012

(87) PCT Pub. No.: WO2011/072448
PCT Pub. Date: Jun. 23, 2011

(65) Prior Publication Data
US 2012/0243545 A1 Sep. 27, 2012

(51) Int. Cl.
*H04L 12/28* (2006.01)
*H04L 12/723* (2013.01)
(Continued)

(52) U.S. Cl.
CPC .......... *H04L 45/50* (2013.01); *H04L 12/4625* (2013.01); *H04L 12/4641* (2013.01); *H04L 45/66* (2013.01); *H04L 45/68* (2013.01)

(58) Field of Classification Search
CPC . H04L 12/4625; H04L 12/4641; H04L 45/50; H04L 45/66
USPC ..................................................... 370/395.53
See application file for complete search history.

(56) References Cited

U.S. PATENT DOCUMENTS

2004/0133619 A1* 7/2004 Zelig et al. .................... 709/200
2004/0174887 A1* 9/2004 Lee ........................... 370/395.53
(Continued)

FOREIGN PATENT DOCUMENTS

GB 2451738 2/2009
WO 2008089305 A2 7/2008
(Continued)

OTHER PUBLICATIONS

Sajassi, A. et al; Provider Backbone Bridges in H-VPLS with MPLS Access; draft-sajassi-12vpn-pbb-bpls-mpls-access-00.txt; Cisco; IETF L2VPN Working Group Internet-draft; Jul. 2008; pp. 1-18.
(Continued)

*Primary Examiner* — Asad Nawaz
*Assistant Examiner* — Syed S Ali
(74) *Attorney, Agent, or Firm* — Patti & Malvone Law Group, LLC

(57) ABSTRACT

A method and corresponding device for determining forwarding rule for data packet in Virtual Private LAN Service with Provider Backbone Bridge (PBB-VPLS) network are disclosed. In the method, a value in a backbone service instance identifier (I-SID) field of the received data packet is firstly examined, then a virtual split horizon group corresponding to the data packets is determined based on the I-SID value, wherein the virtual split horizon group defines a forwarding rule for the data packets between different pseudo wire ports of the PBB-VPLS network. With the dynamic split horizon group, the method dynamically adapts to different forwarding rules for multiple I-VPLS instances with different tree topologies, and is capable of supporting multiple I-VPLS instances with different root sites and tree topologies in one B-VPLS instance, thereby ensuring the stability of the backbone network and reducing the network operation cost.

4 Claims, 4 Drawing Sheets

(51) Int. Cl.
*H04L 12/46* (2006.01)
*H04L 12/721* (2013.01)

(56) References Cited

U.S. PATENT DOCUMENTS

| | | | |
|---|---|---|---|
| 2006/0109802 A1* | 5/2006 | Zelig et al. | 370/258 |
| 2007/0047556 A1* | 3/2007 | Raahemi et al. | 370/395.53 |
| 2007/0263535 A1* | 11/2007 | Shabtay | 370/230 |
| 2008/0019385 A1 | 1/2008 | Sultan et al. | |
| 2008/0101390 A1* | 5/2008 | Hu | 370/401 |
| 2008/0172497 A1 | 7/2008 | Mohan et al. | |
| 2008/0219268 A1 | 9/2008 | Dennison | |
| 2008/0225853 A1* | 9/2008 | Melman et al. | 370/392 |
| 2008/0247406 A1* | 10/2008 | Figueira et al. | 370/401 |
| 2008/0279184 A1* | 11/2008 | He | 370/390 |
| 2009/0080438 A1* | 3/2009 | Zhou et al. | 370/395.53 |
| 2009/0196298 A1 | 8/2009 | Sajasi et al. | |
| 2010/0080238 A1* | 4/2010 | Allan et al. | 370/401 |
| 2010/0274924 A1* | 10/2010 | Allan et al. | 709/245 |
| 2012/0020206 A1* | 1/2012 | Busi et al. | 370/217 |
| 2012/0147740 A1* | 6/2012 | Nakash | 370/221 |

FOREIGN PATENT DOCUMENTS

| | | |
|---|---|---|
| WO | 2008091637 | 7/2008 |
| WO | 2008089305 | 9/2008 |
| WO | 2008118467 | 10/2008 |
| WO | 2009109824 | 9/2009 |
| WO | 2009136252 | 11/2009 |

OTHER PUBLICATIONS

IXIA White Paper; Carrier Ethernet; Sep. 2007; Available: http://www.ixiacom.com/pdfs/library/white_papers/carrier_ethernet.pdf.

\* cited by examiner

METHOD AND DEVICE FOR DETERMINING FORWARDING RULE FOR DATA PACKET

TECHNICAL FIELD OF THE INVENTION

The present invention relates to Virtual Private LAN Service with Provider Backbone Bridge (PBB-VPLS) network, particularly to a method and device for determining forwarding rule for data packet in the PBB-VPLS network.

BACKGROUND OF THE INVENTION

Generally, in the existing PBB-VPLS network, user service bridge domain VPLS (I-VPLS) instances with Hub and Spoke topology (also referred to as rooted multipoint tree topology) can work by configuring multiple provider backbone bridge domain VPLS (B-VPLS) instances, wherein each B-VPLS instance can only support the I-VPLS instances having the same or compatible root site and tree topology.

FIG. 1 shows a schematic diagram of a technical solution which supports multiple I-VPLS instances with different root sites and tree topologies in the existing PBB-VPLS network. As shown in FIG. 1, the PBB-VPLS network is based on an IP/MPLS network, and the provider edge equipment (PE) includes user side provider edge equipments U-PE1, U-PE2, U-PE3, U-PE4 and network side provider edge equipments N-PE1, N-PE2, wherein the N-PE1 receives data packets from the U-PE1 and U-PE2, and the N-PE2 receives data packets from the U-PE3 and U-PE4. Each of the user side provider edge equipments is configured with three I-VPLS instances, wherein two I-VPLS instances I1 and I2 have the same root site and tree topology, and the other one I-VPLS instance I3 has the different root site and tree topology from I1 and I2. Thus, each of the network side provider edge equipments and the user side provider edge equipments is configured with two B-VPLS instances B12 and B3, wherein the I-VPLS instances I1 and I2 are coupled to the B-VPLS instance B12, and the I-VPLS instance I3 is coupled to the B-VPLS instance B3, and the B-VPLS instances at the network side provider edge equipment and the corresponding B-VPLS instances at the user side provider edge equipment are coupled to each other via pseudo wires.

To implement a specific tree topology in an I-VPLS, that is, to control forwarding of the data packets between the different sites for one VPLS instance, Split Horizon Group (SHG) technique is employed. In FIG. 1, the pseudo wire coupling a pair of B-VPLS instances B12 at the N-PE1 and U-PE1 and the pseudo wire coupling a pair of B-VPLS instances B12 at the N-PE1 and U-PE2 (represented with dashed line respectively) belong to the same SHG, the pseudo wire coupling a pair of B-VPLS instances B12 at the N-PE1 and N-PE2 and the pseudo wire coupling a pair of B-VPLS instances B12 at the N-PE2 and U-PE3 (represented with dashed line respectively) belong to the same SHG; and the pseudo wire coupling a pair of B-VPLS instances B3 at the N-PE2 and U-PE3 and the pseudo wire coupling a pair of B-VPLS instances B3 at the N-PE2 and U-PE4 (represented with dot dash line respectively) belong to the same SHG, the pseudo wire coupling a pair of B-VPLS instances B3 at the N-PE1 and N-PE2 and the pseudo wire coupling a pair of B-VPLS instances B3 at the N-PE1 and U-PE2 (represented with dot dash line respectively) belong to the same SHG.

The SHG technique is well known in the art. With this technique, a multipoint-to-multipoint full mesh topology between the sites of the VPLS network can be effectively transformed into a rooted multipoint tree topology. Namely, only communication between a root node and a leaf node is allowed, while communication between leaf nodes is forbidden.

However, due to having to configure multiple B-VPLS instances, the existing technical solution shown in FIG. 1 has following problems: The B-VPLS instances are usually regarded as the infrastructure of the backbone connection, and should be stable and unaffected by user access as much as possible, and the effect due to the user access should be absorbed by the I-VPLS instances configured at the user side provider edge equipments. However, when accessing by the user with the I-VPLS instances having new root sites and tree topologies, since one B-VPLS instance can only serve the I-VPLS instances with the same or compatible root site and tree topology, it is inevitable to configure new B-VPLS instance. Thus, the existing technical solution cannot maintain the structure of the backbone network stable, thereby increasing operation cost.

In the existing technical solution, the tree topology for forwarding data packets is statically determined by the SHG. Once the SHG is configured, the tree topology is fixed, and any I-VPLS instance that does not comply with the tree topology is served by other B-VPLS instance. Therefore, it is not possible for the existing technical solution to support multiple I-VPLS instances with different root sites and tree topologies by one B-VPLS instance.

SUMMARY OF THE INVENTION

The present invention is proposed in view of the above technical problems and the purpose of which is to provide a method and device for determining forwarding rule for data packet in a PBB-VPLS network, which is capable of supporting multiple I-VPLS instances with different root sites and tree topologies by configuring one B-VPLS instance, so as to maintain the backbone network stable and reducing the operation cost of the PBB-VPLS network.

According to a first aspect of the present invention, there is provided a method for determining forwarding rule for data packet in Virtual Private LAN Service with Provider Backbone Bridge (PBB-VPLS) network, which comprises: examining a value in a backbone service instance identifier (I-SID) field of the received data packet; and determining a virtual split horizon group corresponding to the data packet based on the I-SID value, wherein the virtual split horizon group defines a forwarding rule for the data packet between different pseudo wire ports of the PBB-VPLS network.

According to a second aspect of the present invention, there is provided a device for determining forwarding rule for data packet in Virtual Private LAN Service with Provider Backbone Bridge (PBB-VPLS) network, which comprises: examining module that examines a value in a backbone service instance identifier (I-SID) field of the received data packet; and virtual split horizon group determining module that determines a virtual split horizon group corresponding to the data packet based on the I-SID value, wherein the virtual split horizon group defines a forwarding rule for the data packet between different pseudo wire ports of the PBB-VPLS network.

According to a third aspect of the present invention, there is provided a provider edge equipment used in Virtual Private LAN Service with Provider Backbone Bridge (PBB-VPLS) network and disposed at network side, which comprises: the above device for determining forwarding rule for data packet.

DETAILED DESCRIPTION OF THE PREFERRED EMBODIMENT

It is believed that the above and other objects, features and advantages of the present invention will be more apparent from the following detailed description of the embodiments of the present invention taken in conjunction with the accompany drawings.

Figure 1:
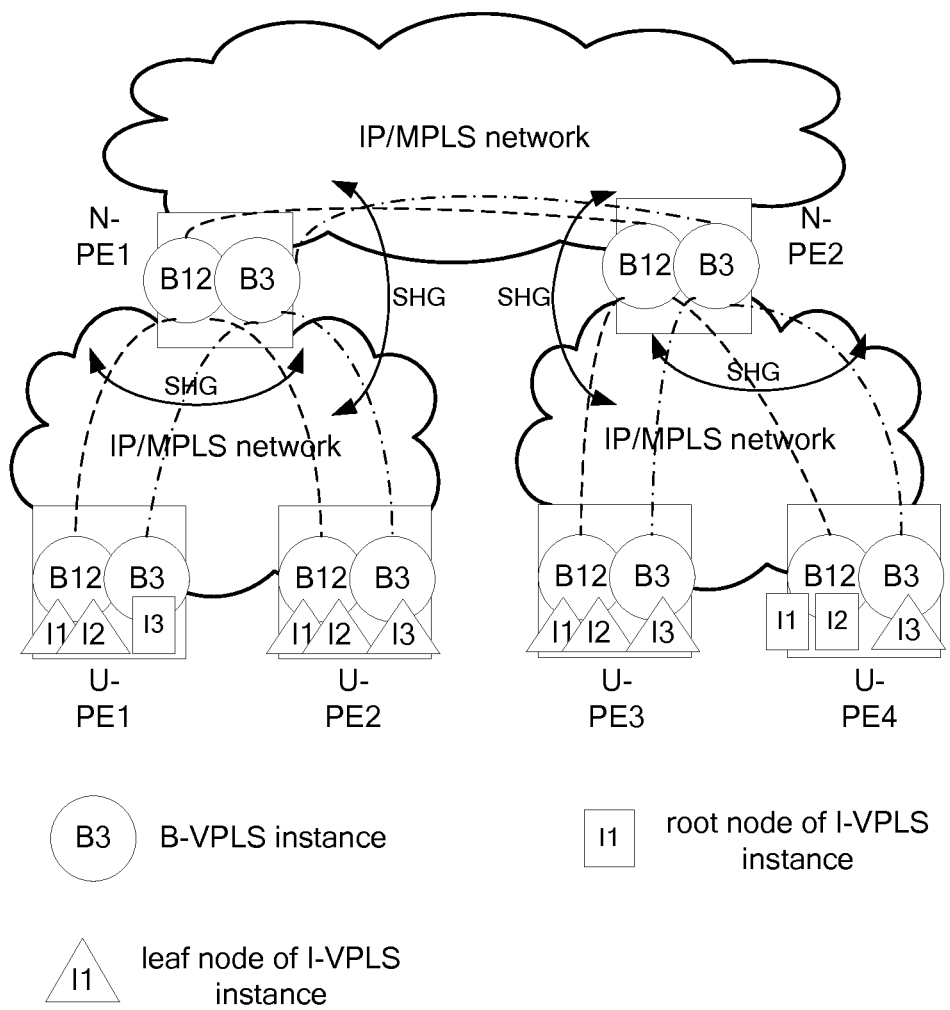
FIG. 1 is a schematic diagram of a technical solution which supports multiple I-VPLS instances with different root sites and tree topologies in the existing PBB-VPLS network.
Figure 2:
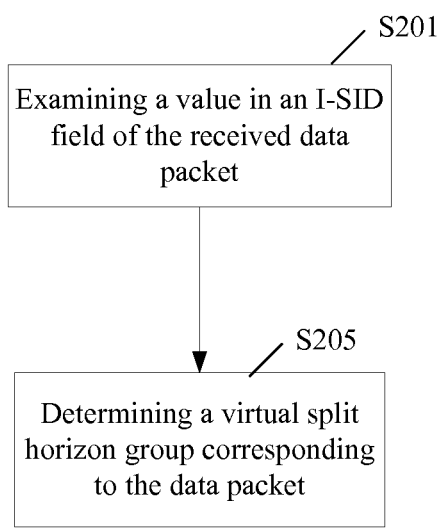
FIG. 2 is a flowchart of the method for determining forwarding rule for data packet in the PBB-VPLS network according to an embodiment of the present invention.

FIG. 2 is a flowchart of the method for determining forwarding rule for data packet in the PBB-VPLS network according to an embodiment of the present invention. The embodiment will be described in detail below in conjunction with the figure.

In this embodiment, the PBB-VPLS network comprises multiple network side provider edge equipments and multiple user side provider edge equipments. Each of the user side provider edge equipments is configured with multiple I-VPLS instances having different root sites and tree topologies and a B-VPLS instance serving these I-VPLS instances and each of the network side provider edge equipments is configured with the corresponding B-VPLS instance. The B-VPLS instance at the network side provider edge equipment and the corresponding B-VPLS instance at the user side provider edge equipment are coupled via a pseudo wire. The method of the embodiment is performed at the network side provider edge equipment.

As shown in FIG. 2, at step S201, a value in a backbone service instance identifier (I-SID) field of the received data packet is examined In this embodiment, the network side provider edge equipment receives the data packet from the coupled user side provider edge equipment via the pseudo wire, and then pseudo wire termination module of the network side provider edge equipment examines the value in the I-SID field of the data packet. It can uniquely determine which I-VPLS instance the data packet belongs to based on the value in the I-SID field.

Next at step S205, the network side provider edge equipment determines a virtual split horizon group corresponding to the data packet based on the value in the examined I-SID field. The virtual split horizon group defines the forwarding rule for the received data packet between the different pseudo wire ports of the PBB-VPLS network. Once the virtual split horizon group corresponding to the data packet is determined, the forwarding rule for the data packet is accordingly determined, that is, which pseudo wire links are forbidden or allowed to forward the data packet.

In this embodiment, upon knowing the value in the I-SID field, the network side provider edge equipment queries a dynamic split horizon group table based on the I-SID value, thereby determining the virtual split horizon group corresponding to the data packet.

The dynamic split horizon group table records a relationship between the I-VPLS instance identified by the I-SID value and the virtual split horizon group. To differentiate from the static split horizon group in the prior art, in the embodiment, a split horizon group entry in the dynamic split horizon group table is referred to as a virtual split horizon group (VSHG). The dynamic split horizon group table may be stored on each of the network side provider edge equipments in the PBB-VPLS network, and is generated by a network management system and distributed to the network side provider edge equipment. When an I-VPLS instance having new root site and tree topology is newly added into the PBB-VPLS network, a new entry will be added in the dynamic split horizon group table, such that the existing B-VPLS instances can support the newly added I-VPLS topology.

Table 1 illustratively shows an example of the dynamic split horizon group table.

TABLE 1

| I-SID1 | VSHG1 |
|---|---|
| I-SID2 | VSHG1 |
| I-SID3 | VSHG2 |
| I-SID4 | VSHG2 |
| I-SID5 | VSHG3 |

In Table 1, each I-SID value uniquely identifies an I-VPLS instance, each VSHG value uniquely identifies a virtual split horizon group, and multiple I-VPLS instances can be mapped to the same virtual split horizon group. In the example of Table 1, there are totally five I-VPLS instances running in the PBB-VPLS network, and the dynamic split horizon group includes three virtual split horizon groups, wherein the I-VPLS instances identified by I-SID1 and I-SID2 are mapped to the virtual split horizon group VSHG1, the I-VPLS instances identified by I-SID3 and I-SID4 are mapped to the virtual split horizon group VSHG2, and the I-VPLS instance identified by I-SID5 is mapped to the virtual split horizon group VSHG3. Different VSHGs correspond to different rules for forbidding or allowing the data packets to be forwarded between the pseudo wire ports, respectively. Thus, it can be seen that the first and second I-VPLS instances have the same or compatible tree topology, the third and fourth I-VPLS instances have the same or compatible tree topology, and the fifth I-VPLS instance has the tree topology that is not compatible with other I-VPLS instances. Upon determining the forwarding rule for the data packet, the network side provider edge equipment N-PE can forward the data packets based on the forwarding rule. It can be seen from the above description that, by using the dynamic split horizon group to dynamically adapt to the different forwarding rules for the I-VPLS instances with different tree topologies, the method of the present embodiment for determining forwarding rule for data packet in the PBB-VPLS network is capable of supporting multiple I-VPLS instances with the incompatible tree topologies in one B-VPLS instance, thereby ensuring the stability of the backbone network and reducing the network operation cost. In addition, the method of the present embodiment only requires that the network side provider edge equipment in the PBB-VPLS network can examine the I-SID field of the data packet, and it is not necessary to change the control plane of the PBB-VPLS network or make any functional extension to the user side provider edge equipment. Thus, the influence due to the deployment of new network side provider edge equipment is very small, which is a "plug-and-play" deployment manner.

Figure 3:
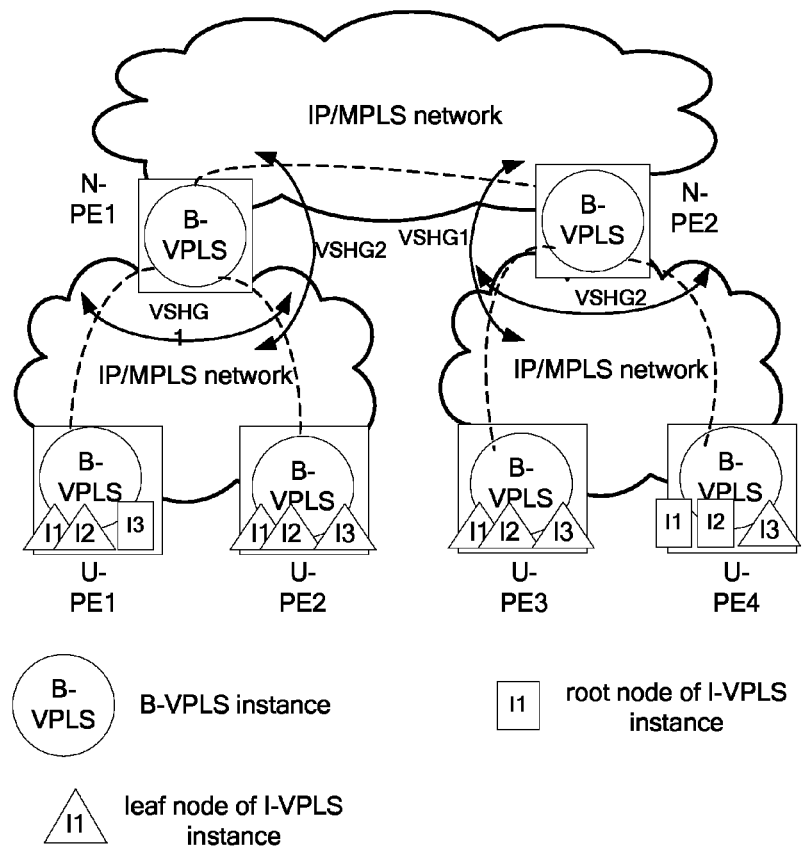
FIG. 3 is a schematic diagram of the PBB-VPLS network in which the method in accordance with the embodiment of the present invention shown in FIG. 2 is applied.

FIG. 3 shows a schematic diagram of the PBB-VPLS network in which the method of the embodiment shown in FIG. 2 is implemented. Multiple I-VPLS instances with incompatible tree topologies can be supported by only configuring one B-VPLS instance on the network side provider edge equipment N-PE1, N-PE2 and the user side provider edge equipment U-PE1, U-PE2, U-PE3, U-PE4. In the PBB-VPLS network shown in FIG. 3, two I-VPLS instances I1 and I2 have the same root site and tree topology, the I-VPLS instance I3 has a root site and tree topology different from the I-VPLS instances I1 and I2, and the I-VPLS instances I1, I2 and I3 are all mapped to the same B-VPLS instance. Since the I-VPLS instances have two different tree topologies, the dynamic split horizon group comprises two virtual split horizon groups VSHG1 and VSHG2. The virtual split horizon group VSHG1 corresponds to the I-VPLS instances I1 and I2, and the virtual split horizon group VSHG2 corresponds to the I-VPLS instance I3. The pseudo wire coupling the N-PE1 and U-PE1 and the pseudo wire coupling the N-PE1 and U-PE2 belong to the virtual split horizon group VSHG1, the pseudo wire coupling the N-PE1 and N-PE2 and the pseudo wire coupling the N-PE2 and U-PE3 belong to the virtual split horizon group VSHG1; and the pseudo wire coupling the N-PE2 and U-PE3 and the pseudo wire coupling the N-PE2 and U-PE4 belong to the virtual split horizon group VSHG2, the pseudo wire coupling the N-PE1 and N-PE2 and the pseudo wire coupling the N-PE1 and U-PE2 belong to the virtual split horizon group VSHG2.

Figure 4:
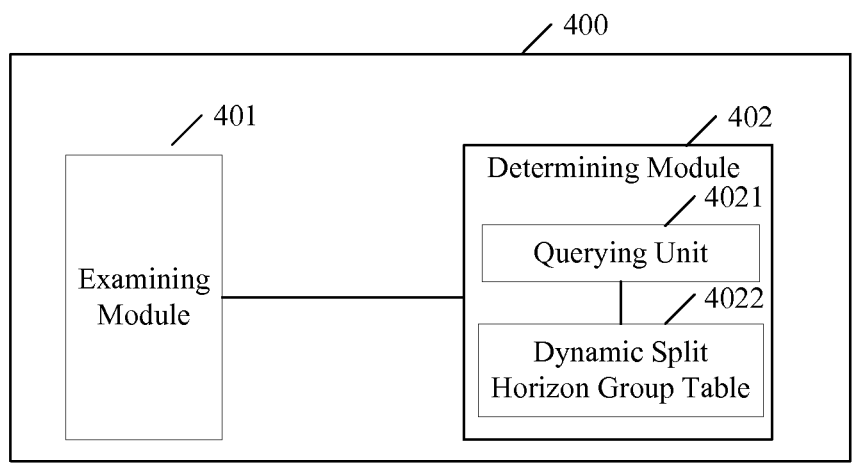
FIG. 4 is an exemplary block diagram of the apparatus for determining forwarding rule for data packet in the PBB-VPLS network according to an embodiment of the present invention.

Under the same inventive concept, FIG. 4 shows an exemplary block diagram of the device 400 for determining forwarding rule for data packet in the PBB-VPLS network according to an embodiment of the present invention. The present embodiment will be described in detail in conjunction with the drawing, in which the description for those same parts as the foregoing embodiment will be properly omitted.

As shown in FIG. 4, the device 400 for determining forwarding rule for data packet in the PBB-VPLS network of the present embodiment comprises: examining module 401 for examining a value in an I-SID field of each of the received data packets; and virtual split horizon group determining module 402 for determining a virtual split horizon group corresponding to the data packet based on the I-SID value obtained by the examining module 401, wherein the virtual split horizon group defines the forwarding rule for the data packet between the different pseudo wire ports of the PBB-VPLS network.

When receiving the data packet, the examining module 401 examines the value in the I-SID field, the I-SID value can uniquely determine which I-VPLS instance the data packet belongs to. Then, in the virtual split horizon group determining module 402, querying unit 4021 queries the dynamic split horizon group table 4022 based on the I-SID value so as to determine the virtual split horizon group corresponding to the data packet. The dynamic split horizon group table 4022 records the relationship between the VPLS instance identified by the I-SID value and the virtual split horizon group.

As mentioned above, the dynamic split horizon group table 4022 is generated and provided by a network management system.

It should be noted that the device 400 of the present embodiment is operable to implement the method for determining forwarding rule for data packet in the PBB-VPLS network shown in FIG. 2.

In addition, the device 400 of the present embodiment may be contained in the network side provider edge equipment.

It should be noted that the device for determining forwarding rule for data packet in the PBB-VPLS network of the above embodiment and its components may be implemented by hardware circuit such as large scale integrated circuit or gate arrays, semiconductors such as logic chip or transistors, or programmable hardware devices such as field programmable gate array, programmable logic device etc, or can be implemented by software executed by various types of processors, or can be implemented by a combination of the above hardware circuit and software.

Although a method and device for determining forwarding rule for data packet in the PBB-VPLS network of the invention have been described above through some exemplary embodiments, these embodiments are not exhaustive, those skilled in the art can realize various changes and modifications within the spirit and scope of the invention. Therefore, the present invention is not limited to these embodiments, and the scope of the invention is only defined by the appended claims.

The invention claimed is:

1. A method for determining forwarding rule for data packet in Virtual Private LAN Service with Provider Backbone Bridge (PBB-VPLS) network, wherein the Virtual Private LAN Service with PBB-VPLS network is capable of supporting multiple I-VPLS instances with different root sites and tree topologies by configuring one B-VPLS instance, the method being performed by a network side provider edge equipment, comprising the steps of:
   examining a value in a backbone service instance identifier (I-SID) field of the received data packet;
   determining a virtual split horizon group (VSHG) corresponding to the data packet by querying a dynamic split horizon group table based on the I-SID value, wherein the virtual split horizon group defines a forwarding rule for the data packet between different pseudo wire ports of the PBB-VPLS network and wherein the dynamic split horizon group table records a relationship between a user service bridge domain VPLS instance identified by the I-SID value and the virtual split horizon group;
   determining the forwarding rule for the data packet from said determined VSHG, that is, which pseudo wire links of the PBB-VPLS network are forbidden or allowed to forward the data packet; and
   forwarding the data packet;
   the dynamic split horizon group table being generated and provided by a network management system and distributed to said network side provider edge equipment, the dynamic split horizon group dynamically adapting to the different forwarding rules the I-VPLS instances with different tree topologies;
   each I-SID value uniquely identifying an I-VPLS instance, each VHSG value uniquely identifying a virtual split horizon group, and multiple I-VPLS instances being mapped to the same VSHG.

2. A network side provider edge equipment for determining forwarding rule for data packet in Virtual Private LAN Service with Provider Backbone Bridge (PBB-VPLS) network, wherein the Virtual Private LAN Service with PBB-VPLS network is capable of supporting multiple I-VPLS instances with different root sites and tree topologies by configuring one B-VPLS instance, said network side provider edge equipment comprising:
   a processor;
   a hardware interface;
   wherein the processor further comprises:
   examining module that examines a value in a backbone service instance identifier (I-SID) field of the received data packet; and
   virtual split horizon group determining module that determines a virtual split horizon group (VHSG) corresponding to the data packet based on the I-SID value, wherein the virtual split horizon group defines a forwarding rule for the data packet between different pseudo wire ports of the PBB-VPLS network, said virtual split horizon group determining module further comprising:

querying unit that queries a dynamic split horizon group table based on the I-SID value, wherein the dynamic split horizon group table records a relationship between a user service bridge domain VPLS instance identified by the I-SID value and the virtual split horizon group, so as to determine the virtual split horizon group corresponding to the data packet, the dynamic split horizon group table recording a relationship between a user service bridge domain VPLS instance identified by the I-SID value and the virtual split horizon group the dynamic split horizon group table being generated and provided by a network management system and distributed to said network side provider edge equipment, the dynamic split horizon group dynamically adapting to the different forwarding rules the I-VPLS instances with different tree topologies;

each I-SID value uniquely identifying an I-VPLS instance, each VHSG value uniquely identifying a virtual split horizon group, and multiple I-VPLS instances being mapped to the same VSHG.

3. The device of claim 2, wherein said Virtual Private LAN Service with PBB-VPLS network is capable of supporting multiple I-VPLS instances with different root sites and tree topologies by configuring one B-VPLS instance, the virtual split horizon group determining module being configured to further determine the forwarding rule for the data packet from said determined VSHG, that is, which pseudo wire links of the PBB-VPLS network are forbidden or allowed to forward the data packet.

4. A provider edge equipment used in Virtual Private LAN Service with Provider Backbone Bridge (PBB-VPLS) network and disposed at network side, wherein the Virtual Private LAN Service with PBB-VPLS network is capable of supporting multiple I-VPLS instances with different root sites and tree topologies by configuring one B-VPLS instance, said network side provider edge equipment comprising:

a processor;
a hardware interface;
wherein the processor further comprises:
examining module that examines a value in a backbone service instance identifier (I-SID) field of the received data packet; and
virtual split horizon group determining module that determines a virtual split horizon group (VHSG) corresponding to the data packet based on the I-SID value, wherein the virtual split horizon group defines a forwarding rule for the data packet between different pseudo wire ports of the PBB-VPLS network, said virtual split horizon group determining module further comprising:
querying unit that queries a dynamic split horizon group table based on the I-SID value, wherein the dynamic split horizon group table records a relationship between a user service bridge domain VPLS instance identified by the I-SID value and the virtual split horizon group, so as to determine the virtual split horizon group corresponding to the data packet, the dynamic split horizon group table recording a relationship between a user service bridge domain VPLS instance identified by the I-SID value and the virtual split horizon group;

the dynamic split horizon group table being generated and provided by a network management system and distributed to said network side provider edge equipment, the dynamic split horizon group dynamically adapting to the different forwarding rules the I-VPLS instances with different tree topologies;

each I-SID value uniquely identifying an I-VPLS instance, each VHSG value uniquely identifying a virtual split horizon group, and multiple I-VPLS instances being mapped to the same VSHG.

* * * * *